(12) United States Patent
Shibata et al.

(10) Patent No.: US 7,281,574 B2
(45) Date of Patent: Oct. 16, 2007

(54) AUTOMOTIVE AIR CONDITIONING SYSTEM

(75) Inventors: Kazuji Shibata, Kariya (JP); Yoshio Yoshida, Handa (JP)

(73) Assignee: DENSO Corporation, Kariya (JP)

( * ) Notice: Subject to any disclaimer, the term of this patent is extended or adjusted under 35 U.S.C. 154(b) by 522 days.

(21) Appl. No.: 10/775,879

(22) Filed: Feb. 10, 2004

(65) Prior Publication Data

US 2004/0194948 A1 Oct. 7, 2004

(30) Foreign Application Priority Data

Feb. 13, 2003 (JP) .............................. 2003-035406

(51) Int. Cl.
*F25B 29/00* (2006.01)
*B60H 1/00* (2006.01)
*B60H 3/00* (2006.01)

(52) U.S. Cl. ................... 165/203; 165/204; 165/42; 165/43; 454/120; 454/121; 454/156; 454/160; 454/161; 454/907

(58) Field of Classification Search ............. 165/203, 165/42, 43; 237/12.3 A, 12.3 B; 454/121, 454/156, 120, 907, 160, 161
See application file for complete search history.

(56) References Cited

U.S. PATENT DOCUMENTS 5,042,566 A * 8/1991 Hildebrand ............... 165/42
5,711,368 A * 1/1998 Ito et al. ................... 165/42
6,059,018 A * 5/2000 Yoshinori et al. ......... 165/42
6,244,335 B1 * 6/2001 Nakamura et al. ........ 165/203
6,474,406 B2 * 11/2002 Sano et al. ................ 165/42
6,622,787 B1 * 9/2003 Toyoshima et al. ....... 165/203
6,871,696 B2 * 3/2005 Aoki et al. ................ 165/43

FOREIGN PATENT DOCUMENTS

| JP | 61-78713 | 5/1986 |
|---|---|---|
| JP | 61-150611 | 9/1986 |
| JP | 11-235916 | 8/1999 |
| JP | 2002-114021 | 4/2002 |

OTHER PUBLICATIONS

Office Action dated Nov. 13, 2006 in corresponding Japanese Application No. 2003-035406.

* cited by examiner

*Primary Examiner*—John K. Ford
(74) *Attorney, Agent, or Firm*—Harness, Dickey & Pierce, PLC (57) ABSTRACT

A rear face inlet 25 and a foot inlet 28, and a rear face duct portion 26 and a foot duct portion 31 which are adapted to distribute air from the inlets, respectively, are disposed in alignment with each other in a transverse direction of a vehicle. As a result, a conventional overlapping portion where the rear face inlet and the foot inlet are made to overlap each other vertically somewhere along the length of each of the inlets in a transverse direction of the vehicle and a conventional overlapping portion where the rear face duct and the rear foot duct are disposed in such a manner as to overlap each other in a longitudinal direction of the vehicle somewhere along the length of a downwardly extending portion of each of the ducts can be eliminated, whereby the air conditioning unit can be constructed so as to be decreased in size vertically and longitudinally.

6 Claims, 5 Drawing Sheets

AUTOMOTIVE AIR CONDITIONING SYSTEM

BACKGROUND OF THE INVENTION

1. Field of the Invention

The present invention relates to a conditioned air distribution structure for an automotive air conditioning system which can enhance a comfortable feeling, that rear-seat passengers can feel in an air-conditioned atmosphere within a passenger compartment, by providing, mainly in an air conditioning unit for front-seat occupants, a rear face duct for delivering conditioned air toward the upper body of the rear-seat passenger and a rear foot duct for delivering conditioned air toward the lower body of the rear-seat passenger.

2. Description of the Related Art

The applicant of this patent application has filed a patent application for an automotive air conditioning system as described above, which has been published as JP-A-11-235916. The automotive air conditioning system in which the rear-face duct and the rear foot duct are provided, is intended to be small in size and the rear face duct and the rear foot duct are disposed in such a manner as to overlap each other in a longitudinal direction of the vehicle somewhere along the length of a downwardly extending portion of each of the ducts.

Then, the foot-duct is caused to branch into a right-hand side duct portion and a left-hand side duct portion at an intermediate location along an air downstream side of the foot-duct, and a space produced by so branching the foot duct, that is, a dead space has been found useful for the rear face duct to be disposed therein in such a manner that the rear face duct is bent toward the front of the vehicle so as to enter the dead space, whereby the longitudinal size of the air conditioning unit can be decreased.

In the conventional automotive air conditioning system, however, a rear face inlet port and a foot inlet port are disposed in such a manner as to overlap each other vertically somewhere along the length of each of the ports in a transverse direction of the vehicle, and moreover, the rear face duct and the rear foot duct are disposed in such a manner as to overlap each other in the longitudinal direction of the vehicle somewhere along the length of the downwardly extending portion of each of the ducts. Due to this construction, there remains a problem that the length (size) of the air conditioning unit cannot be decreased vertically and longitudinally at those overlapping portions.

SUMMARY OF THE INVENTION

The present invention was made in view of the problem inherent in the related art, and an object thereof is to decrease the size of an automobile air conditioning system in which a rear face duct for delivering conditioned air toward the upper body of a rear-seat passenger and a rear-foot duct for delivering conditioned air toward the lower body of the rear-seat passenger are provided mainly in an air conditioning unit for front-seat occupants.

With a view to attaining the object, according to an aspect of the invention, there is provided an automotive air conditioning system having an air conditioning unit (10) which constitutes an airflow path into a passenger compartment and which is disposed substantially at a transversely central portion in a front part of the passenger compartment, a rear-face duct portion (26) for guiding conditioned air towards the upper bodies of rear-seat occupants, and a foot duct portion (31) for guiding conditioned air towards the lower bodies of front-seat and rear-seat occupants, the rear-face duct portion (26) and the foot duct portion (31) being disposed at a longitudinally rearward location in the air conditioning unit (10), wherein, at an upper location in the air conditioning unit (10), a rear face inlet (25) through which the conditioned air is allowed to flow out into the rear face duct portion (26) is made to open substantially at a transversely central portion, and a foot inlet (28) through which the conditioned air is allowed to flow out into the foot duct portion (31) is made to open transversely outwardly of the rear face inlet (25) in transverse alignment therewith, the rear face duct portion (26) and the foot duct portion (31) which extend downwardly from the respective inlets (25, 28) for so guiding the conditioned air being disposed in transverse alignment with each other.

According to the construction, as the rear face inlet (25) and the foot inlet (28), and the rear face duct portion (26) and the foot duct portion (31) which are disposed so as to distribute conditioned air from the rear face inlet (25) and the foot inlet (28), respectively, are disposed in such a manner as to be in transverse alignment with each other, respectively, the conventional overlapping portion where the rear face inlet and the foot inlet are made to overlap each other vertically somewhere along the length of each of the inlets in the transverse direction of the vehicle and the conventional overlapping portion where the rear face duct and the rear foot duct are disposed in such a manner as to overlap each other in the longitudinal direction of the vehicle somewhere along the length of the downwardly extending portion of each of the ducts can be eliminated, whereby the air conditioning unit (10) can be constructed so as to be decreased in size vertically and longitudinally.

According to another aspect of the invention, there is provided an automotive air conditioning system, wherein a front face opening (24) for delivering conditioned air towards upper halves of the bodies of the front seat occupants is formed above both the inlets (25, 28), and the front face opening (24) and the foot inlet (28) are selectively opened and closed by a main plate portion (29a) of a single door member (29), and wherein the door member (29) has a communicating portion (29c) provided in the main plate portion (29a) in such a manner as to correspond to the rear face inlet (25) and a sub-plate portion (29b) adapted to rotate with the main plate portion (29a) in an interlocking fashion so as to close the rear face inlet (25), whereby in a state in which the main plate portion (29a) opens the front face opening (24) while closing the foot inlet (28), the communicating portion (29c) and the rear face inlet (25) are allowed to communicate with each other while the sub-plate portion (29b) opens the rear face inlet (25), whereas in a state in which the main plate portion (29a) opens the foot inlet (28) while closing the front face opening (24), the sub-plate portion (29b) closes the rear face inlet (25).

According to this construction, the front face opening (24) and the rear face inlet (25) which are located at the different positions can be opened and closed simultaneously only by operating the single door member (29), whereby the link components conventionally provided to make the plurality of doors interlock with one another can be eliminated.

According to a further aspect of the invention, there is provided an automotive air conditioning system, wherein the front face opening (24) has a side face opening portion (24a) which is made to open substantially at a transversely central portion in the upper location of the air conditioning unit (10) and to which a side face duct for blowing out air from transversely end portions within the passenger compartment towards upper halves the bodies of the front-seat occupants and vehicle front side window glasses is connected, and a center face opening portion (24b) which is made to open in such a manner as to be aligned with the side face opening portion (24a) transversely outwardly in the upper location of the air conditioning unit (10) and to which a center face duct for blowing out air from a central portion within the passenger compartment towards the upper bodies of the front-seat occupants is connected and whereby, in a state in which the main plate portion (29a) closes the front face opening (24), the main plate portion (29a) closes the center face opening portion (24b) while the communicating portion (29c) and the side face opening portion (24a) are allowed to communicate with each other.

According to this construction, mainly in a foot mode for blowing out heated air toward lower half the body of the occupant in a heating condition, while the center face opening portion (24b) for blowing out air towards the upper body of the occupant is closed by the main plate portion (29a) of the door member (29), the side face opening portion (24a) for blowing out air towards the vehicle front side window glasses is allowed to remain communicating via the communicating portion (29c) formed in the main plate portion (29a) so that heated air flows to the side face opening portion (24a) through the communicating portion (29c), whereby the capability of defogging the side window glasses can be enhanced.

According to an aspect of the invention, there is provided an automotive air conditioning system, wherein a seal portion (29d) formed of an elastic member can be formed around a periphery of the sub-plate portion (29b). According to this construction, the door can be sealed while variations in position and angle that would occur in association with the layout of the rear face inlet (25) and the sub-plate portion (29b) of the door member (29) which are provided on an air conditioning case and operation thereof are absorbed by the seal portion (29d) formed of the elastic member such as an elastomer. In addition, the noise produced when the door member (29) slams shut can be suppressed.

According to another aspect of the invention, there is provided an automotive air conditioning system, wherein a connecting portion (29e) between the main plate portion (29a) and the sub-plate portion (29b) adopts an elastic construction or can be formed of an elastic member. According to this construction, as well, the door can be sealed while variations in position and angle that would occur in association with the layout of the rear face inlet (25) and the sub-plate portion (29b) of the door member (29) which are provided on the air conditioning case and the operation thereof are absorbed by the elastic connecting portion (29e). In addition, the noise produced when the door member (29) slams shut can be suppressed.

In addition, as the connecting portion (29e) between the main plate portion (29a) and the sub-plate portion (29b) is made to be elastic, in an automotive air conditioning system which can provide little longitudinal space, even if the size is decreased to a size in which the sub-plate portion (29b) strikes against a wall surface of the air conditioning casing when the foot inlet (28) is closed by the main plate portion (29a), the connecting portion (29e) can deflect to absorb such a striking contact, whereby the air conditioning unit can be constructed smaller in size in the longitudinal direction of the vehicle. Note that parenthesized reference numerals imparted to the respective means indicate corresponding relationships with specific means that will be described later on with respect to an embodiment.

The present invention may be more fully understood from the description of a preferred embodiment of the invention, as set forth below, together with the accompanying drawings.

DESCRIPTION OF THE PREFERRED EMBODIMENT

Figure 1:
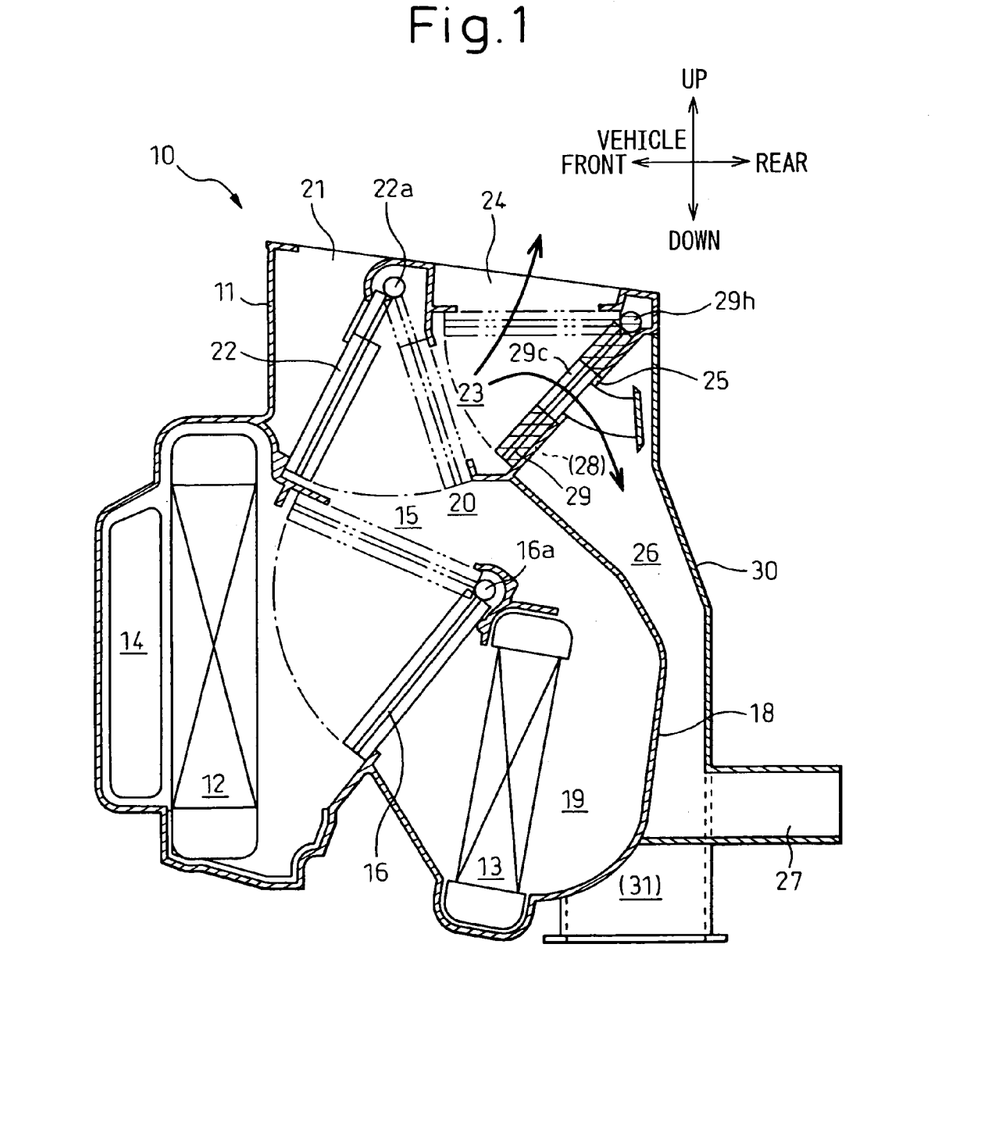
FIG. 1 is a cross-sectional view of an air conditioning unit according to an embodiment of the invention, which shows a state in which a face delivery mode is selected.

An embodiment of the present invention will be described below based on the accompanying drawings. FIG. 1 is a drawing showing the construction of an air conditioning unit 10 according to an embodiment of the invention, and is a schematic cross-sectional view the air conditioning unit 10 taken off at a position where a rear face duct portion 26 is disposed transversely centrally of a vehicle.

A ventilation system of an automotive air conditioning system according to the embodiment of the invention is broadly divided into two units; a blower unit, which is not shown, and the air conditioning unit 10 shown in FIG. 1. The blower unit is disposed below an instrument panel in the passenger compartment of the vehicle at a position which is slightly offset from a central portion towards a front-passenger seat. In contrast to this, the air conditioning unit 10 is disposed below the instrument panel in the passenger compartment at a position which is located transversely and centrally in the vehicle.

As is known, the blower unit includes an inside air and outside air switching box for switching between inside air (air recirculated within the passenger compartment) and outside air (air taken in from the outside of the passenger compartment) for introduction into the unit and a blower for drawing in air through this inside air and outside air switching box for delivery into the system. This blower is such that a known centrifugal multi-blade fan (a sirocco fan) is driven to rotate by an electric motor.

The air conditioning unit 10 is arranged to constitute a airflow path into the passenger compartment which is located downstream of the blower unit, and according to the embodiment, the air conditioning unit 10 is of a type in which both a refrigeration cycle evaporator (a cooling heat exchanger) 12 and a heater core (a heating heat exchanger) 13 are integrally accommodated within two air conditioning cases 11.

The two air conditioning cases 11 are formed of a resin molded product such as polypropylene which has a certain degree of elasticity and which is superior in strength and are made up of two vertically split case members which are divided or separated transversely. Namely, the two air conditioning cases 11 are made up of a right-side case positioned on a side facing the right-side of the vehicle and a left-side case positioned on a side facing the left-side of the vehicle.

Note that in reality, hatched portions in FIG. 1 represent split surfaces where the two cases are split. The heat exchangers 12, 13 and devices such as doors that will be described later on are accommodated in the two cases 11, and thereafter, the cases 11 are combined together with fastening means such as metallic spring clips and screws to thereby constitute the air conditioning unit 10.

In addition, the air conditioning unit 10 is disposed below the instrument panel substantially at a transversely central portion in a front part of the passenger compartment in a mode as shown in FIG. 1 with respect to longitudinal and vertical directions of the vehicle, and an air inlet port 14 is formed in the air conditioning cases 11 at a longitudinally front-most location thereof.

As this air inlet port 14 connects to an air outlet portion of the blower unit which is disposed at the location in front of the front-passenger seat, the air inlet port 14 opens in a side of one of the air conditioning cases which is located on the front-passenger seat side. Incidentally, in this embodiment, an example is illustrated in which the invention is applied to a left-hand drive vehicle, and therefore, conditioned air delivered from the blower unit disposed rightward of the air conditioning unit 10 flows into the air inlet port 14.

Within the air conditioning cases 11, the evaporator 12 is disposed at a location immediately downstream of the air inlet port 14. This evaporator 12 is formed thinner in the longitudinal direction and is disposed vertically in such a manner as to extend across a passage within the air conditioning cases 11. Consequently, air delivered from the air inlet port 14 is caused to flow into a front side of the evaporator 12 which extends in the vertical direction of the vehicle.

The evaporator 12 is of a known stacked type in which a number of flattened tubes each constructed by combining two sheets metal such as of aluminum are stacked together with a corrugated fin being interposed between any two of the flattened tubes so stacked, and the evaporator 12 is thereafter brazed together. As is known, this evaporator 12 constitutes a cooling evaporator for cooling conditioned air which passes through it by absorbing heat from the passing conditioned air which is used as latent heat for evaporation of the refrigerant of the refrigeration cycle.

Then, the heater core 13 is disposed downstream of the evaporator 12 along the airflow (or rearward of the evaporator 12 as viewed longitudinally) with a predetermined space being provided therebetween. The heater core 13 is intended to reheat cool air which has passed through the evaporator 12, and hot water (engine coolant) flows through the interior of the heater core 13. Thus, the heater core 13 constitutes a heating heat exchanger for heating air using the hot water as a heat source.

The heater core 13 is of a known type in which a number of flattened tubes each constructed by joining two sheets metal such as of aluminum through welding and so forth so as to form a flat cross section are stacked together with a corrugated fin being interposed between any two of the flattened tubes so stacked, and the heater core 13 is thereafter brazed together. The heater core 13 so constructed is disposed at a lower part in the air conditioning cases 11 in such a manner as to incline towards the rear of the vehicle.

In the air passage within the air conditioning cases 11, a cold air bypass passage 15 through which air (cold air) that has bypassed the heater core 13 is allowed to pass is formed somewhere above the heater core 13. In addition, an air mixing door 16 made up of a flat plate for adjusting a ratio of an amount of cold air that is reheated at the heater core 13 and an amount of cold air that flows into the cold air bypass passage 15 to thereby bypass the heater core 13 is disposed at a location between the heater core 13 and the evaporator 12.

Here, the air mixing door 16 is integrally combined with a rotational shaft 16a which is horizontally disposed, so that the air mixing door 16 is allowed to rotate vertically together with the rotational shaft 16a. This air mixing door 16 constitutes a temperature adjusting means for adjusting the temperature of air that is forced into the passenger compartment as a result of the adjustment of the ratio of air amounts.

The rotational shaft 16a is rotationally supported on the air conditioning cases 11 and one end portion of the rotational shaft 16a protrudes to the outside of the air conditioning case 11 so as to be coupled to an actuator mechanism using a servo motor or a manual operation mechanism via a link mechanism, not shown, whereby the rotational position of the air mixing door 16 is constructed to be adjusted by this actuator mechanism or the manual operation mechanism.

Then, in the air conditioning cases 11, a wall portion 18, extending vertically with a predetermined space being provided between the heater core 13 and the wall portion 18 itself, is formed integrally therewith and downstream of the heater core 13 in the airflow path (at a location rearward of the heater core 13). A heated air passage 19 which extends upwardly immediately after the heater core 13 is formed by this wall surface 18. A downstream side (an upper side) of the heated air passage 19 joins the cold air bypass passage 15 above the heater core 13 to thereby form an air blending portion 20 where cold air and heated air are mixed together.

In an upper side portion (an upper location) of the air conditioning case 11, a defroster opening portion 21 is made to open at a location facing the front of the vehicle in such a manner as to be adjacent to the cold air bypass passage 15 and the air mixing portion 20. This defroster opening portion 21 is where cold air from the cold air bypass passage 15 and temperature-adjusted conditioned air from the air mixing portion 20 are delivered and connects to a defroster outlet via a defroster duct, which is not shown, air being blown out from this defroster outlet towards a windscreen.

The defroster opening portion 21 is opened and closed by a defroster door 22 which is something like a flat plate. This defroster door 22 is constructed to rotate around a rotational shaft 22a which is disposed horizontally near the top side of the air conditioning case 11. A plate portion of the defroster door 22 has a resin or metallic door substrate and an elastic seal member formed of an elastic seal material such as a urethane foam is fixedly applied to front and back sides of the substrate. The rotational shaft 22a is disposed at a downstream location of a cold airflow which flows from the cold air bypass passage 15 towards the air mixing portion 20 near part of a circumferential edge portion of the defroster opening portion 21, so that a distal end portion of the defroster door 22 extends to face an upstream side of the cold airflow.

In addition, the defroster door is constructed to close a communicating opening 23 at a position indicated by double-dashed lines. This communicating opening 23 is intended to deliver conditioned air from the air mixing portion 20 towards a front face opening 24, a foot inlet 28 and a rear face inlet 25 which are provided on a downstream side of the airflow. Conditioned air that has passed through the communicating opening 23 is then switched to be delivered towards the front face opening 24 and the rear face inlet 25 or the foot inlet 28 by a face-foot switching door 29. This face-foot switching door 29 constitutes a main part of the invention and therefore will be described in detail later on.

Figure 2:
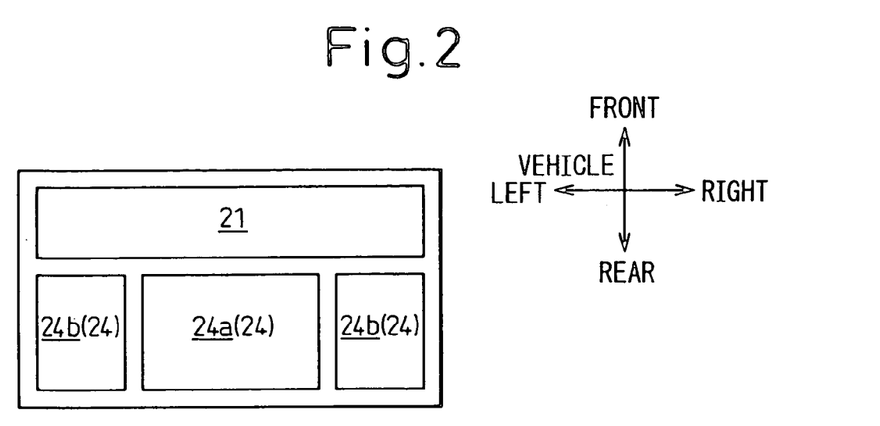
FIG. 2 is a view showing an arrangement of openings at a top side portion of the air conditioning unit shown in FIG. 1.

FIG. 2 is a view showing an arrangement of openings at a top side portion of the air conditioning unit shown in FIG. 1. The front face opening 24 is made to open rearward of the defroster opening 21 (closer to the front-seat occupants) in the top side portion of the air conditioning unit 10. This front face opening 24 is mainly intended to deliver conditioned air that has passed through the communicating opening 23 towards upper halves the bodies of the front-seat occupants.

As shown in FIG. 2, the front face opening 24 is divided into center face opening portions 24b and a side face opening portion 24a in such a manner that the side face opening portion 24a is provided at a central portion of the air conditioning unit 10, whereas the center face opening portions 24b are disposed on both sides of the side face opening portion 24a or transversely outwardly of the side face opening portion 24a, respectively. Then, the center face opening portions 24b connect to center face outlets disposed at transversely central and vertically upper portions on the instrument panel via center face ducts, which are not shown, air being then blown out towards upper halves the bodies of the front-seat occupants from these outlets.

In addition, the side face opening portion 24a connects to side face outlets disposed at transversely end and vertically upper portions on the instrument panel via side face ducts, which are not shown, air being then blown out towards the upper bodies of the front-seat occupants or towards the front side window glasses. As is already known, the side face outlet has an air direction changing device which is manually controlled, and the direction of blown-out air can be changed towards the upper half the body of the front-seat occupant or the front side window glass by adjusting the direction of a air deflector plate of the air direction changing device.

Figure 3:
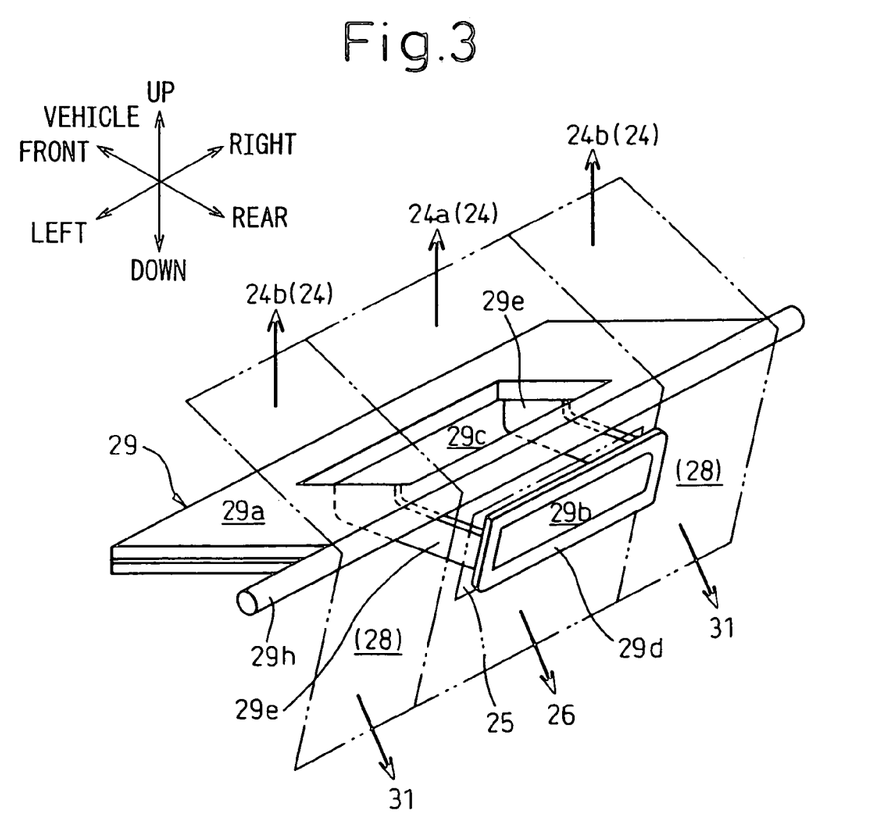
FIG. 3 is a perspective view illustrating the construction of a face-foot switching portion of the air conditioning unit shown in FIG. 1.
Figure 4:
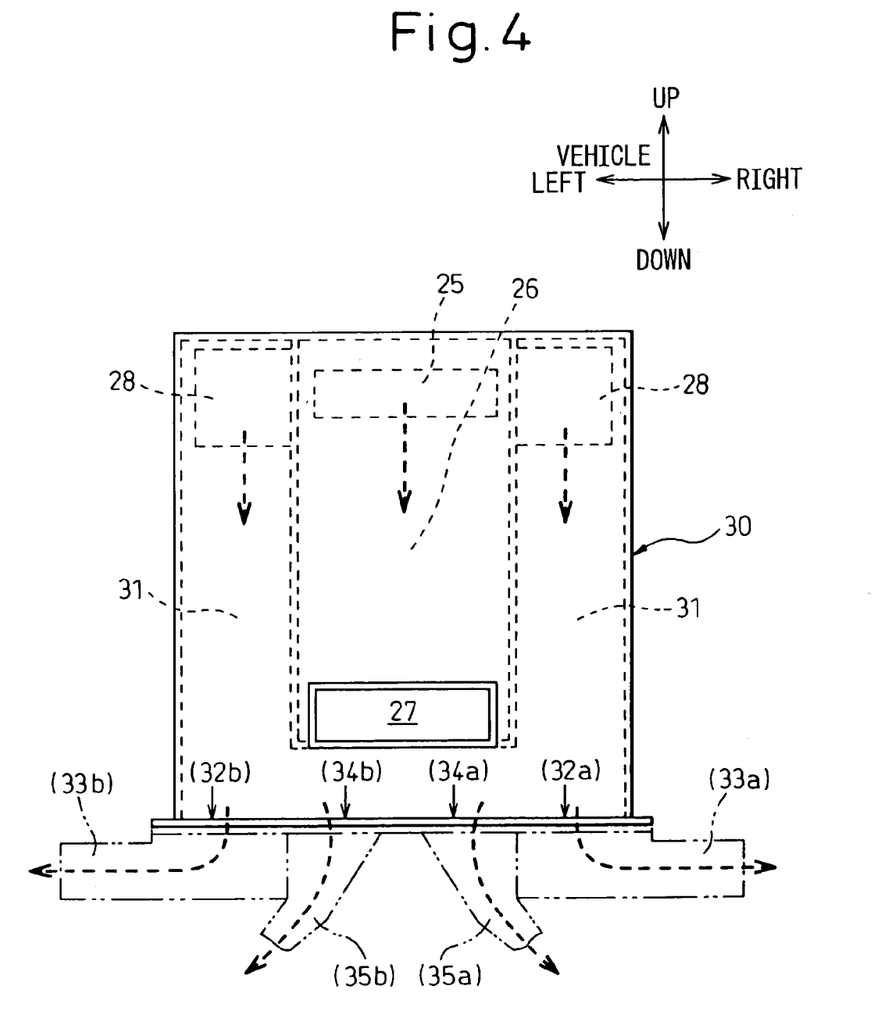
FIG. 4 is a view of the air conditioning unit shown in FIG. 1 as seen from a rear towards a front of the vehicle.

FIG. 3 is a perspective view describing the construction of a face-foot switching portion of the air conditioning unit, and FIG. 4 is a view of the air conditioning unit as seen from the rear of the vehicle towards the front thereof. The rear face inlet 25 and the foot inlet 28 are formed in a door seal surface of the face-foot switching door 29 which is opposite to a side thereof which faces the front face opening 24. The rear face inlet 25 is provided at the transversely central portion of the air conditioning unit 10, and the foot inlet 28 is disposed on either side of the rear face inlet 25 or transversely outwardly of the rear face inlet 25.

The rear face inlet 25 constitutes an air inlet to a rear face duct portion 26, which then extends downwardly from the rear face inlet 25 so as to form an end opening 27 at a lower end portion thereof. A rear face duct, which is not shown, connects to the end opening 27, and air is discharged towards the upper body of the rear-seat passenger from a rear face outlet provided at a distal end of the rear face duct.

The foot inlet 28 constitutes an air inlet to the foot duct portion 31, which then extends downwardly from the foot inlet 28 so as to deliver conditioned air towards the lower bodies of the front-seat and rear-seat occupants. A right front seat foot opening portion 32a and a left front seat foot opening portion 32b which are made to open downwardly are formed at bottom central portions of the foot duct portions 31, and air introduced into both the opening portions 32a, 32b is discharged towards the lower bodies of the left and right front-seat occupants from foot outlets provided at distal ends of both foot ducts 33a, 33b.

In addition, a right rear seat foot opening portion 34a and a left rear seat foot opening portion 34b which are made to open similarly downwardly are formed transversely outwardly of the opening portions 32a, 32b, and rear foot ducts 35a, 35b connect to the opening portions 34a, 34b, respectively. Then, air introduced into both the opening portions 34a, 34b is delivered to the lower bodies of the left and right rear-seat occupants from rear foot outlets provided at distal ends of the rear foot ducts 35a, 35b, respectively.

These rear face duct portion 26 and the foot duct portions 31 are disposed such that the rear face duct portion 26 is provided substantially transversely centrally of the air conditioning unit 10, each of the foot duct portions 31 being disposed transversely outwardly of the rear face duct portion 26 so disposed. Note that in this embodiment, the rear face duct portion 26 and the foot duct portions 31 are formed by combining a sub-case 30 with the air conditioning cases 11. Incidentally, the left and right foot duct portions 31 may be made to communicate with or be separated from each other below the end opening 27 of the rear face duct portion 26.

Distal ends of the rear face duct and the rear foot ducts 35a, 35b, which are all not shown, are disposed in such a manner as to extend toward the rear of the vehicle between the driver's seat and the front passenger seat, and the rear face outlets are disposed at a rearward location on a center console which is disposed between the driver's seat and the front passenger seat for accommodating articles therein, and the rear foot outlets are disposed under the left and right front seats.

Next, the face-foot switching construction according to the invention will be described. The rear face inlet 25 and the foot inlet 28 are positioned below the front face opening 24 and are provided in such a manner as to confront the front face opening 24. Then, the switching between the front face opening 24 and the rear face inlet 25 or the foot inlet 28 is implemented by the face-foot switching door 29.

As shown in FIG. 3, the face-foot switching door 29 includes a rotational shaft 29h which is rotationally supported on the air conditioning cases 11, a flat plate-like main door portion (a main plate portion) 29a which provided on the rotational shaft 29h, and a flat plate-like sub-door portion (a sub-plate portion) 29b which is connected to the main door portion 29 so as to interlock therewith by a connecting portion 29e. The main door portion 29a is intended to implement switching between the front face opening 24 and the foot inlet 28 and is constructed such that the elastic seal material such as urethane foam is fixedly applied to the front and back side of the resin or metallic door substrate.

The sub-door portion 29b is intended to open and close the rear face inlet 25 and is constructed so as to close the rear face inlet 25 when the main door portion 29a closed the front face opening 24 (in a foot delivery mode). Then, a seal lip (a seal portion) 29d is formed of an elastic material such as an elastomer resin around the periphery of the sub-door portion 29b, so that a seal is maintained when the rear face inlet 25 is closed by the sub-door portion 29b.

In addition, a communicating hole (a communicating portion) 29c is opened in a central portion of the main door portion 29a in such a manner as to correspond to the rear face inlet 25 so that the rear face inlet 25 is not closed by the main door portion 29a when the foot inlet 28 is closed by the main door portion 29a (in a face delivery mode). Note that the defroster door 22 and the face-foot switching door 29 constitutes door means for switching air delivery modes of the automotive air conditioning system, and the doors are coupled to a link mechanism, not shown, so as to be operated in an interlocking fashion when an air delivery mode switching mechanism is controlled.

Next, the function of the air conditioning system that is constructed as has been described heretofore will be described. As is known, the automotive air conditioning system includes an electronic control unit (not shown) into which control signals from various control members provided on an air conditioning control panel and sensor signals from various sensors provided for controlling air conditioning, and the following air delivery modes can be set by selecting operating positions for the defroster door 22 and the face-foot switching door 29 by output signals from the control unit. Note that the delivery air temperature can be adjusted optionally by rotating the air mixing door 16 from a maximum or full cooling position shown in FIG. 1 to a maximum or full heating position shown in FIG. 5.

(1) Face Delivery Mode

FIG. 1 shows a state in which a face delivery mode is selected. The defroster door 22 is operated to be located at a position indicated by solid lines, whereby the defroster opening portion 21 is closed while the communicating opening 23 is fully opened. In addition, the face-foot switching door 29 is also operated to be located at a position indicated by solid lines in FIG. 1 so as to close the foot inlet 28. As a result, the front face opening 24 is opened and the rear face inlet 25 is also opened through the communicating hole 29c in the face-foot switching door 29.

Air delivered from the blower unit, not shown, is cooled at the evaporator 12 to become cold air, and this cold air is then passed to the front face opening 24 and the rear face duct 26 so as to be blown out towards upper halves the bodies of front-seat and rear-seat occupants eventually. Thus, the temperature-adjusted air can be controlled so as to flow only to the front face outlets and rear face outlets in such a limited fashion.

(2) Bi-level Delivery Mode

The defroster door 22 is operated to be located at the position indicated by the solid lines, whereby the defroster opening portion 21 is closed while the communicating opening 23 is fully opened. In addition, the face-foot switching door 29 is operated to be located at an intermediate position between the position indicated by the solid lines and a position indicated by double-dashed lines in FIG. 1 so as to open all the front face opening 24, the rear face inlet 25 and foot inlet 28. As a result, air delivered from the blower unit is allowed to be discharged towards upper halves the bodies of the occupants through the front face opening 24 and the rear face duct 26, and air that has flowed into the foot duct 31 is delivered towards lower halves the bodies of the occupants of the left and right front and rear seats.

(3) Foot Delivery Mode

Figure 5:
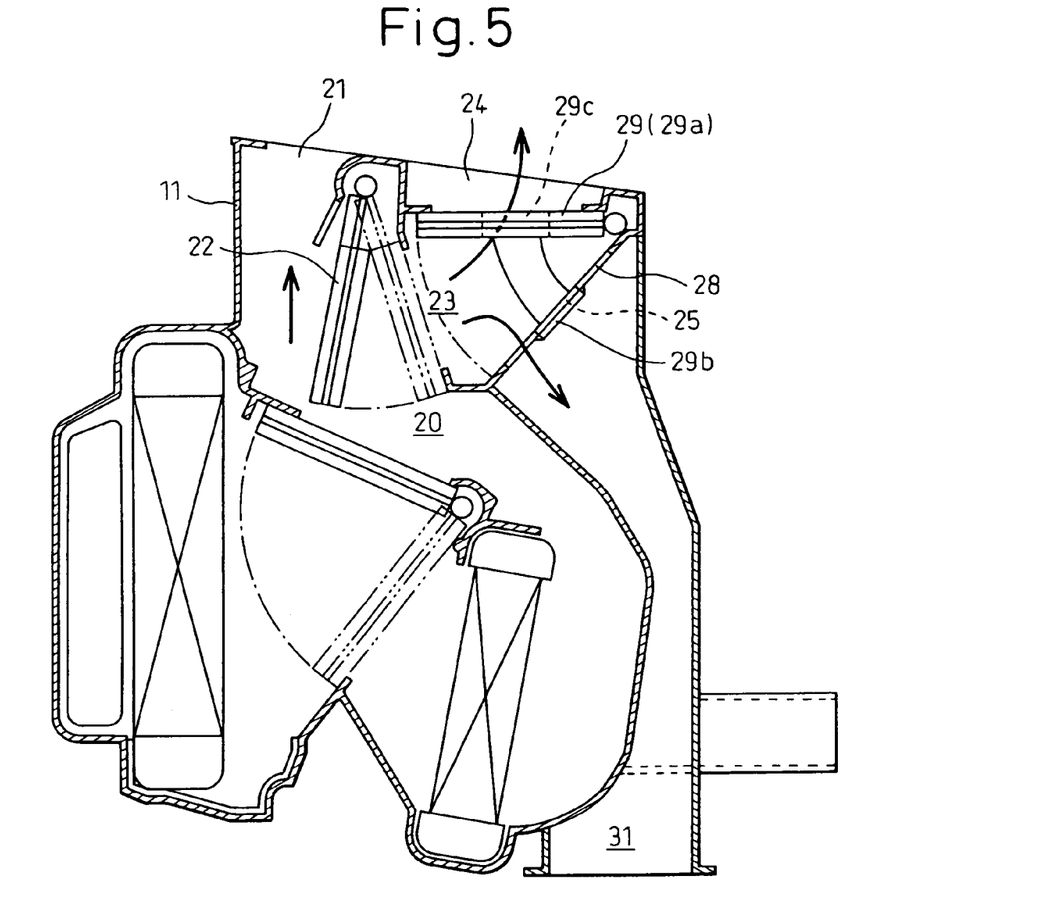
FIG. 5 is a cross-sectional view of the air conditioning unit shown in FIG. 1 which shows a state in which a foot delivery mode is selected.

FIG. 5 is a schematic cross-sectional view of the air conditioning unit portion 10 shown in FIG. 1 taken where the foot duct portion 31 is located (refer to FIG. 4), which shows a state in which a foot deliver mode is selected. In the foot deliver mode, the face-foot switching door 29 is operated to be located at a position indicated by solid lines in FIG. 5, whereby the face-foot switching door 29 is positioned on the front face opening 24 side so as to close the same opening, while the foot inlet 28 is left fully opened, with the rear face inlet 25 being closed by the sub door portion 29b of the face-foot switching door 29.

As this occurs, in the front face opening 24, while the center face opening portions 24b are closed by the main door portion 29a of the face-foot switching door 29, the side face opening portion 24a is left opened via the communicating hole 29c in the face-foot switching door 29. On the other hand, the defroster door 22 is operated to be located at a position indicated by solid lines in FIG. 5 so as to open the communicating opening 23 substantially to its maximum extent. As a result, temperature-adjusted air is introduced into the foot duct portions 31 via the foot inlets 28 and is then passed through the side face opening portion 24a to be introduced to the side face outlets.

Due to this, air delivered from the blower unit is discharged towards an inner surface of the windscreen in a small amount through the defroster opening portion 21, and air introduced into the foot ducts 31 is delivered to lower halves the bodies of the occupants of the left and right front and rear seats. In addition, air introduced into the side face opening portion 24a is discharged towards upper halves of the bodies of the front-seat occupants or the front side window glasses.

(4) Foot-Defroster Delivery Mode

In a foot-defroster delivery mode, the face-foot switching door 29 is operated to be located at the same position as in the foot delivery mode, where the center face opening portions 24b and the rear face inlet 25 are closed, whereas the foot inlet 28 is fully opened and the side face opening portion 24a is opened through the communicating hole 29c. On the other hand, the defroster door 22 is operated to rotate slightly in a counterclockwise direction from the position indicated by the solid lines in FIG. 5.

Due to this, as in the case with the aforesaid foot delivery mode, air delivered from the blower unit is discharged through the defroster opening portion 21 to the inner surface of the windscreen, not shown, and air introduced into the foot ducts 31 is delivered to lower halves of the bodies of the occupants of the left and right front and rear seats. In addition, air that has flowed into the side face opening portion 24a is discharged towards upper halves the bodies of the front-seat occupants or the front side window glasses. Note that in this foot-defroster delivery mode, the amount of air that is delivered to the defroster opening portion 21 is increased when compared with that resulting in the foot delivery mode.

(5) Defroster Delivery Mode

In a defroster delivery mode, the defroster door 22 is operated to be located at a position indicated by double-dashed lines in FIG. 5 so as to close the communicating hole 23. As a result, air delivered from the blower unit is allowed to flow into the defroster opening 21 from the air mixing portion 20 and is then discharged from the defroster outlet towards the windscreen for defogging it. Note that a communicating portion which communicates with the side face opening portion 24a is provided in the defroster door 22 and the air conditioning case 11 so that temperature-adjusted air delivered to this communicating portion is used to defog the vehicle front side window glasses.

Next, the characteristics of the invention will be described. Firstly, there is provided the automotive air conditioning system having the air conditioning unit 10 which constitutes the airflow path into the passenger compartment and which is disposed substantially at the transversely central portion in the front part of the passenger compartment, the rear-face duct portion 26 for guiding conditioned air towards upper halves the bodies of the rear-seat occupants, and the foot duct portions 31 for guiding conditioned air towards the lower bodies of the front-seat and rear-seat occupants, the rear-face duct portion 26 and the foot duct portions 31 being disposed at the longitudinally rearward location in the air conditioning unit 1, wherein, at the upper location in the air conditioning unit 10, the rear face inlet 25 through which the conditioned air is allowed to flow out into the rear face duct portion 26 is made to open substantially at the transversely central portion, and the foot inlet 28 through which the conditioned air is allowed to flow out into the foot duct portion 31 is made to open transversely outwardly of the rear face inlet 25 in transverse alignment therewith, the rear face duct portion 26 and the foot duct portion 31 which extend downwardly from the respective inlets 25, 28 for so guiding the conditioned air being disposed in transverse alignment with each other.

According to the construction, as the rear face inlet 25 and the foot inlet 28, and the rear face duct portion 26 and the foot duct portion 31 which are disposed so as to distribute conditioned air from the rear face inlet 25 and the foot inlet 28, respectively, are disposed in such a manner as to be in transverse alignment with each other, respectively, the conventional overlapping portion where the rear face inlet and the foot inlet are made to overlap each other vertically somewhere along the length of each of the inlets in the transverse direction of the vehicle and the conventional overlapping portion where the rear face duct and the rear foot duct are disposed in such a manner as to overlap each other in the longitudinal direction of the vehicle somewhere along the length of the downwardly extending portion of each of the ducts can be eliminated, whereby the air conditioning unit 10 can be constructed so as to be decreased in size vertically and longitudinally.

In addition, there is provided the automotive air conditioning system, wherein the front face opening portion 24 for delivering conditioned air towards the upper bodies of the front seat occupants is formed above both the inlets 25, 28, and the front face opening 24 and the foot inlet 28 are selectively opened and closed by the main door portion 29*a* of the single face-foot switching door 29, wherein the face-foot switching door 29 has the communicating hole 29*c* provided in the main door portion 29*a* in such a manner as to correspond to the rear face inlet 25 and a sub-door portion 29*b* adapted to rotate with the main door portion 29*a* in an interlocking fashion so as to close the rear face inlet 25, whereby in the state in which the main door portion 29*a* opens the front face opening 24 while closing the foot inlet 28, the communicating hole 29*c* and the rear face inlet 25 are allowed to communicate with each other while the sub-door portion 29*b* opens the rear face inlet 25, whereas in the state in which the main door portion 29*a* opens the foot inlet 28 while closing the front face opening 24, the sub-door portion 29*b* closes the rear face inlet 25.

According to this construction, the front face opening 24 and the rear face inlet 25 which are located at the different positions can be opened and closed simultaneously only by operating the single face-foot switching door 29, whereby the link components conventionally provided to make the plurality of doors to interlock with one another can be eliminated.

Furthermore, there is provided the automotive air conditioning system, wherein the front face opening 24 has a side face opening portion 24*a* which is made to open substantially at a transversely central portion in the upper location of the air conditioning unit 10 and to which the side face outlet for blowing out air from transversely end portions within the passenger compartment towards upper halves the bodies of the front-seat occupants and vehicle front side window glasses is connected and center face opening portion 24*b* which are made to open in such a manner as to be aligned with the side face opening portion 24*a* transversely outwardly in the upper location of the air conditioning unit 10 and to which the center face outlet for blowing out air from the central portion within the passenger compartment towards the upper bodies of the front-seat occupants is connected, whereby in the state in which the main door portion 29*a* closes the front face opening 24, the main door portion 29*a* closes the center face opening portions 24*b* while the communicating hole 29*c* and the side face opening portion 24*a* are allowed to communicate with each other.

According to this construction, mainly in the foot mode for blowing out heated air toward lower half the body of the occupant in the heating condition, while the center face opening portions 24*b* for blowing out air towards upper half the body of the occupant are closed by the main door portion 29*a* of the face-foot switching door 29, the side face opening portion 24*a* for blowing out air towards the vehicle front side window glasses is allowed to remain communicating via the communicating hole 29*c* formed in the main door portion 29*a* so that heated air flows to the side face opening portion 24*a* through the communicating hole 29*c*, whereby the capability of defogging the side window glasses can be enhanced.

Moreover, there is provided the automotive air conditioning system, wherein the seal lip 29*d* formed of the elastic member can be formed around the periphery of the sub-door portion 29*b*. According to this construction, the door can be sealed while variations in position and angle that would occur in association with the layout of the rear face inlet 25 and the sub-door portion 29*b* of the face-foot switching door 29 and operation thereof are absorbed by the seal lip 29*d* formed of the elastic member such as an elastomer. In addition, the noise produced when the face-foot switching door 29 slams shut can be suppressed.

Figure 6A:
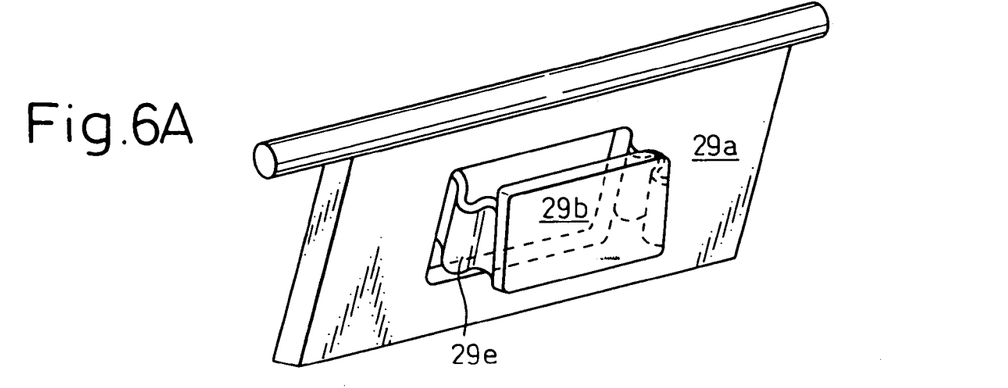
FIGS. 6A to 6C are perspective views showing modifications to a face-foot switching door according to the embodiment of the invention.
Figure 6B:
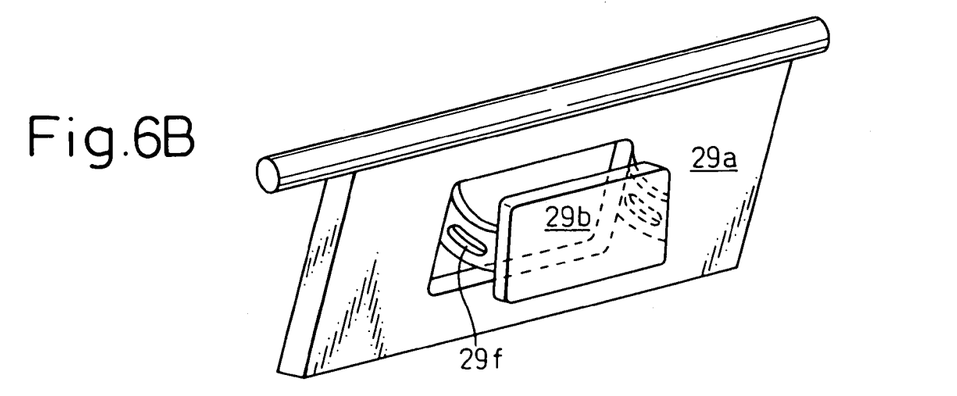
Figure 6C:
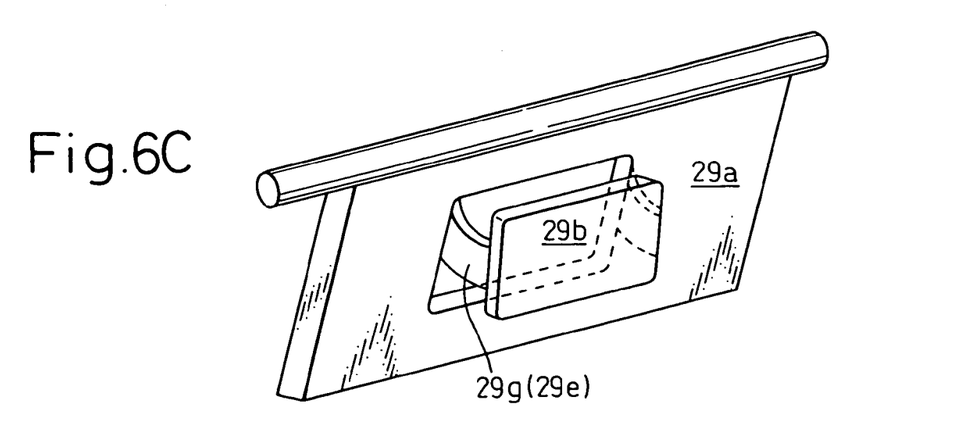

FIGS. 6A to 6C are perspective views showing modifications made to the face-foot switching door according to the embodiment of the invention. FIG. 6A shows a modified example in which a deflectable configuration is provided at a connecting portion 29*e*, FIG. 6B shows a modified example in which a ventilation hole is formed in a connecting portion 29*e*, and FIG. 6C shows a modified example in which a connecting portion 29*e* is formed of an elastic member 29*g* such as from an elastomer resin. In any of the modified examples, the connecting portion 29*e* adopts the elastic construction, or is formed of the elastic member 29*g*, thereby making it possible to facilitate the elastic deformation of the sub-door portion 29*b* relative to the main door portion 29*a*.

According to this construction, the door can be sealed while variations in position and angle that would occur in association with the layout of the rear face inlet 25 and the sub-door portion 29*b* of the face-foot switching door 29 which are provided on the air conditioning cases 11 and operation thereof are absorbed by the elastic connecting portion 29*e*. In addition, the noise produced when the face-foot switching door 29 slams shut can be suppressed.

In addition, as the connecting portion 29*e* between the main door portion 29*a* and the sub-plate portion 29*b* is made to be elastic, in the automotive air conditioning system which can provide no longitudinal space, even if the size is decreased to a size in which the sub-door portion 29*b* strikes against a wall surface of the air conditioning casing 11 when the foot inlet 28 is closed by the main door portion 29*a*, the connecting portion 29*e* can deflect to absorb such a striking contact, whereby the air conditioning unit can be constructed smaller in size in the longitudinal direction of the vehicle.

Note that while, in the embodiment, the longitudinal, transverse and vertical directions of the air conditioning unit 10 are restricted, the invention is not limited thereto and the air conditioning unit 10 may be oriented otherwise. In addition, needless to say, the invention can be applied equally to an air conditioning system in which an evaporator (a cooling heat exchanger) 12 is not provided within an air conditioning unit 10.

While the invention has been described by reference to the specific embodiment chosen for purposes of illustration, it should be apparent that numerous modifications could be made thereto by those skilled in the art without departing from the basic concept and scope of the invention.

The invention claimed is:

1. A combined automotive vehicle and air conditioning system having an air conditioning unit which defines an airflow path into a passenger compartment of the automotive vehicle, the vehicle defining a longitudinal, front and rear, direction and a transverse, side to side, direction, the air conditioning unit being disposed substantially at a transverse central portion of the automotive vehicle in a front part of the passenger compartment,
    a rear-face duct portion for guiding conditioned air towards upper bodies of rear-seat occupants, and
    a foot duct portion for guiding conditioned air towards lower halves of bodies of front-seat and rear-seat occupants, the rear-face duct portion and the foot duct portion being disposed at a longitudinally rearward location in the air conditioning unit, wherein, at an upper location in the air conditioning unit, a rear face inlet, through which the conditioned air is allowed to flow out into the rear face duct portion, is made to open substantially at the transverse central portion of the automotive vehicle, and a foot inlet, through which the conditioned air is allowed to flow out into the foot duct portion, is made to open transversely outwardly of the rear face inlet in a transverse alignment therewith, the rear face duct portion and the foot duct portion extending downwardly from the respective inlets to guide the conditioned air being disposed in the transverse alignment with each other; wherein
    a front face opening for delivering conditioned air towards upper bodies of the front seat occupants is formed above both the inlets and the front face opening and the foot inlet are selectively opened and closed by a main plate portion of a single door member, and wherein the door member has a communicating portion provided in the main plate portion in such a manner as to correspond to the rear face inlet and a sub-plate portion adapted to rotate with the main plate portion in an interlocking fashion so as to close the rear face inlet, the door member configured such that in a state in which the main plate portion opens the front face opening while closing the foot inlet, the communicating portion and the rear face inlet are allowed to communicate with each other while the sub-plate portion opens the rear face inlet, whereas in a state in which the main plate portion opens the foot inlet while closing the front face opening, the sub-plate portion closes the rear face inlet.

2. A combined automotive vehicle and air conditioning system as set forth in claim 1, wherein the front face opening has a side face opening portion which is made to open substantially at the transverse central portion of the automotive vehicle in the upper location of the air conditioning unit and to which a side face duct for blowing out air from transverse end portions within the passenger compartment towards the upper bodies of the front-seat occupants and vehicle front side window glasses is connected and a center face opening portion which is made to open in such a manner as to be aligned with the side face opening portion transversely outwardly in the upper location of the air conditioning unit and to which a center face duct for blowing out air from a central portion within the passenger compartment towards upper halves the bodies of the front-seat occupants is connected, the door member configured such that in a state in which the main plate portion closes the front face opening, the main plate portion closes the center face opening portion while the communicating portion and the side face opening portion are allowed to communicate with each other.

3. A combined automotive vehicle and air conditioning system as set forth in claim 1, wherein a seal portion formed of an elastic member is formed around a periphery of the sub-plate portion.

4. A combined automotive vehicle and air conditioning system as set forth in claim 1, wherein a connecting portion between the main plate portion and the sub-plate portion adopts an elastic construction or is formed of an elastic member.

5. A combined automotive vehicle and air conditioning system as set forth in claim 1, further having a rotational shaft which is rotationally supported relative to the air conditioning unit, wherein the main plate portion is fixed to the rotational shaft at one end portion thereof and is provided so as to rotate in conjunction with the rotation of the rotational shaft, wherein the sub-plate portion is fixed to the main-plate portion via a connecting portion having a predetermined rotational distance.

6. A combined automotive vehicle and air conditioning system as set forth in claim 5, wherein the predetermined rotational distance is a rotational distance over which the main-plate portion covers a state in which the main-plate portion closes the front face opening and a state in which the main-plate portion closes the foot duct portion.

* * * * *